(12) United States Patent
Rees

(10) Patent No.: US 8,485,483 B2
(45) Date of Patent: Jul. 16, 2013

(54) SUPPORT FOR SOLAR PANELS

(75) Inventor: Kyle J. Rees, Woobridge (CA)

(73) Assignee: Kyle Rees, Toronto, Ontario (CA)

( * ) Notice: Subject to any disclaimer, the term of this patent is extended or adjusted under 35 U.S.C. 154(b) by 119 days.

(21) Appl. No.: 13/089,506

(22) Filed: Apr. 19, 2011

(65) Prior Publication Data

US 2012/0091297 A1      Apr. 19, 2012

Related U.S. Application Data

(60) Provisional application No. 61/362,049, filed on Jul. 7, 2010.

(51) Int. Cl.
*A47G 29/02*     (2006.01)
*E04G 3/20*       (2006.01)
*E06B 7/28*       (2006.01)

(52) U.S. Cl.
USPC ........................................ 248/237; 52/173.3

(58) Field of Classification Search
USPC .............. 248/126, 148, 237; 52/173.3, 173.1, 52/27, 741.1; 220/780, 781, 675, 671, 631; 126/704, 623, 621
See application file for complete search history.

(56) References Cited

U.S. PATENT DOCUMENTS

| | | | |
|---|---|---|---|
| 6,105,316 A * | 8/2000 | Bottger et al. | 52/173.3 |
| 6,968,654 B2 * | 11/2005 | Moulder et al. | 52/173.3 |
| 7,658,356 B1 * | 2/2010 | Nehls | 248/300 |
| 8,122,682 B2 * | 2/2012 | Mischo | 52/747.1 |
| 2012/0096781 A1 * | 4/2012 | Romesburg | 52/173.3 |

FOREIGN PATENT DOCUMENTS

CA           D 132750         6/2010

* cited by examiner

*Primary Examiner* — Nkeisha Smith
(74) *Attorney, Agent, or Firm* — Conley Rose, P.C.

(57) ABSTRACT

A solar panel support includes a plastic body, having front, back, bottom, and side walls defining a hollow box-like shape. The front wall is lower than the back wall. Side walls include upper side edges sloping from the back wall to the front wall. A ledge extends from the bottom, side, front, and back walls, and an upstanding flange around the ledge is generally L-shape in section. The side walls include a plurality of removable access portions that when open enable passing of electrical services therethrough. The back and front walls each include a plurality of a generally wedge-shaped depressions. Each side wall includes a rectangular depression surrounding the removable portions and a generally right-angular abutment is formed at a junction between each side wall and the back wall and the front wall. The bottom wall includes a plurality of generally circular depression formations.

4 Claims, 4 Drawing Sheets

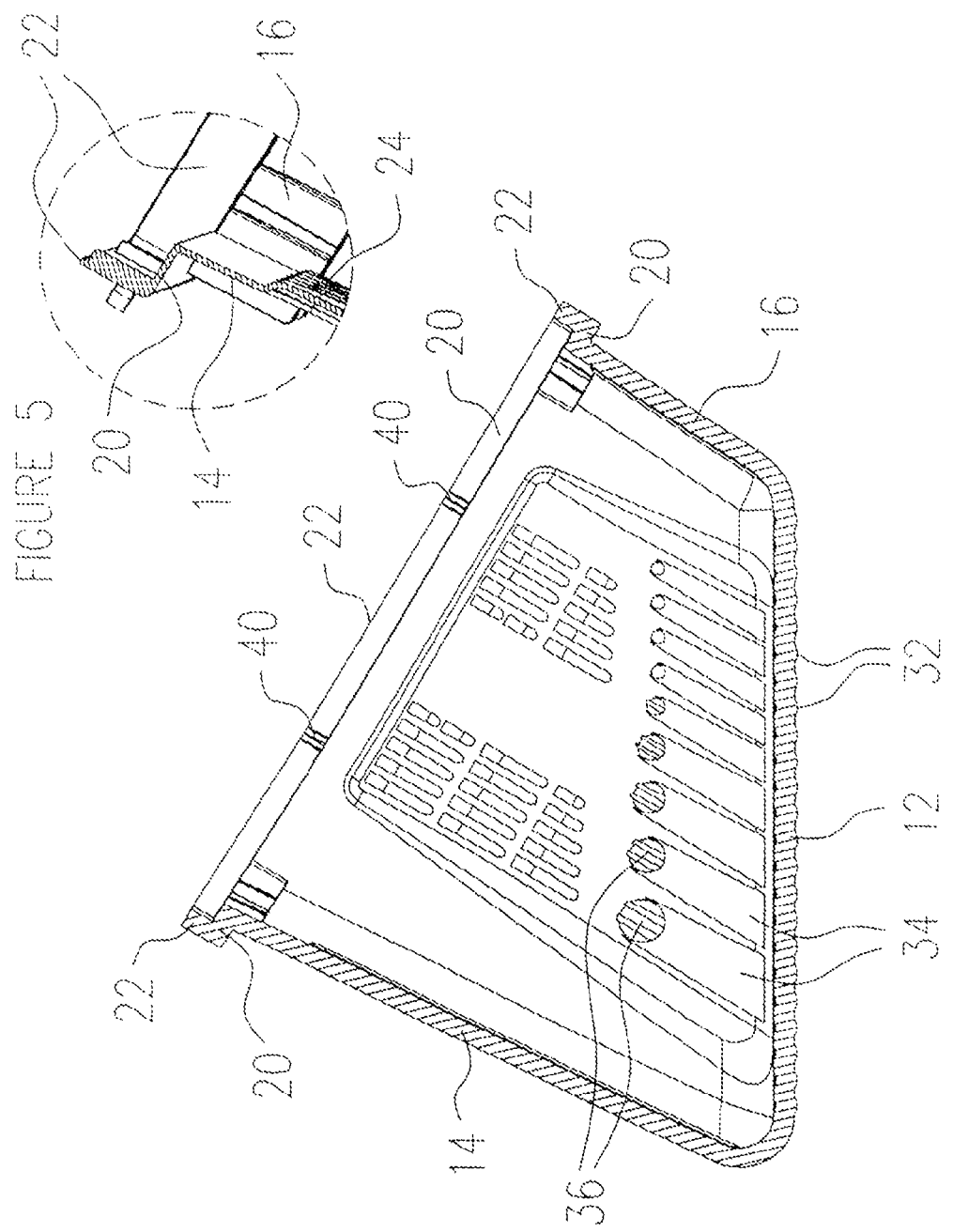

SUPPORT FOR SOLAR PANELS

CROSS-REFERENCE TO RELATED APPLICATION

This application claims the benefit of priority to Canadian Patent Application No. 2,701,864 filed Apr. 21, 2010 and U.S. application Ser. No. 61/362,049, filed Jul. 7, 2010, the contents of each are hereby incorporated by reference in their entirety for all purposes.

STATEMENT REGARDING FEDERALLY SPONSORED RESEARCH OR DEVELOPMENT

Not applicable.

BACKGROUND OF THE INVENTION

Field of the Invention

The invention relates to the field of solar panels for generating electrical power, and in particular to a free standing support for mounting such solar panels on a substrate, without attachment to the substrate.

Solar panels for generating electricity are well known. It is essential that such solar panels shall be mounted at an angle which is ensures optimum performance, in the latitude for which they are intended. Due to the changing angle of incidence of the rays of the sun, from one latitude to another, and from one season and time of day to another, the performance of such solar panels is at its optimum when the rays of the sun impact the panel at about the perpendicular.

Obviously the perfect solution would be to have panels supports for such panels which have some form of azimuth movement. However tracking the changing position of the sum such supports would be expensive , and would require servicing to keep them operational.

As a compromise, supports are made which hold such panels at fixed angles and orientations to the sun. These fixed angles will be dependent on the latitude in which the panels are installed.

It is also desirable to provide such supports which can be placed on a variety of substrates, and which are self standing and which do not require actual fastenings or anchors securing the panel supports directly into such substrate.

Preferably such panel supports will be made of material which has a long life in harsh environmental conditions Preferably there will be no moving parts, to avoid need for servicing.

Preferably the panel supports can be made in large numbers and are self nesting for compact storage and shipment.

It is advantageous if the panel supports can be formed with openings in predetermined places and located for passage of electrical services form one panel support to another.

Such panel supports will provide protection for the back or underside of each solar panel, and will provide secure containment of all electrical wiring and connections.

Such panel supports should also provide for secure and safe attachment of such solar panels, free of entry of precipitation, and protected from wind.

BRIEF SUMMARY OF THE INVENTION

With a view to achieving these various objectives the invention provides a solar panel support formed of a single integral one piece moulded plastic body, having a bottom wall, two side walls and front and back walls, defining a hollow open topped box-like shape, wherein the front wall is lower and the back wall is higher, and wherein the two side walls define upper side edges sloping from the back wall down to the front wall, a ledge extending out from the said walls, and a upstanding flange around said ledge defining a generally L-shape in section, a plurality of removable access portions in each said side wall, for opening the same to pass electrical services there through, a plurality of generally wedge shaped depressions in said back wall, a plurality of generally wedge shaped depressions in said front wall, a rectangular depression in each said side wall, surrounding said removable portions, a generally right angular abutment formed at the junction between each of said side walls and said back wall and said front wall, a plurality of generally circular depression formations in said bottom wall, a pair of parallel depressions running from back to front of said bottom wall intermediate said side walls, a pair of generally parallel depressions running between said back to front depressions, defining a generally rectangular shape in plan;

Preferably, there will be four lifting tabs one at each corner between said side walls and said back and front walls, a plurality of spacer abutments formed on said L-shaped flanges at spaced intervals, and, a plurality of generally U-shaped recesses formed in said L-shaped flange on said back wall.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

BRIEF DESCRIPTION OF THE DRAWINGS

Examples of embodiments of the invention will now be described in detail with reference to the accompanying drawings, in which:

FIG. 4 is a section along line 4-4 of FIG. 1, and,

FIG. 5 is an enlarged detail of a corner portion showing the abutments.

DETAILED DESCRIPTION OF THE INVENTION

Figure 1:
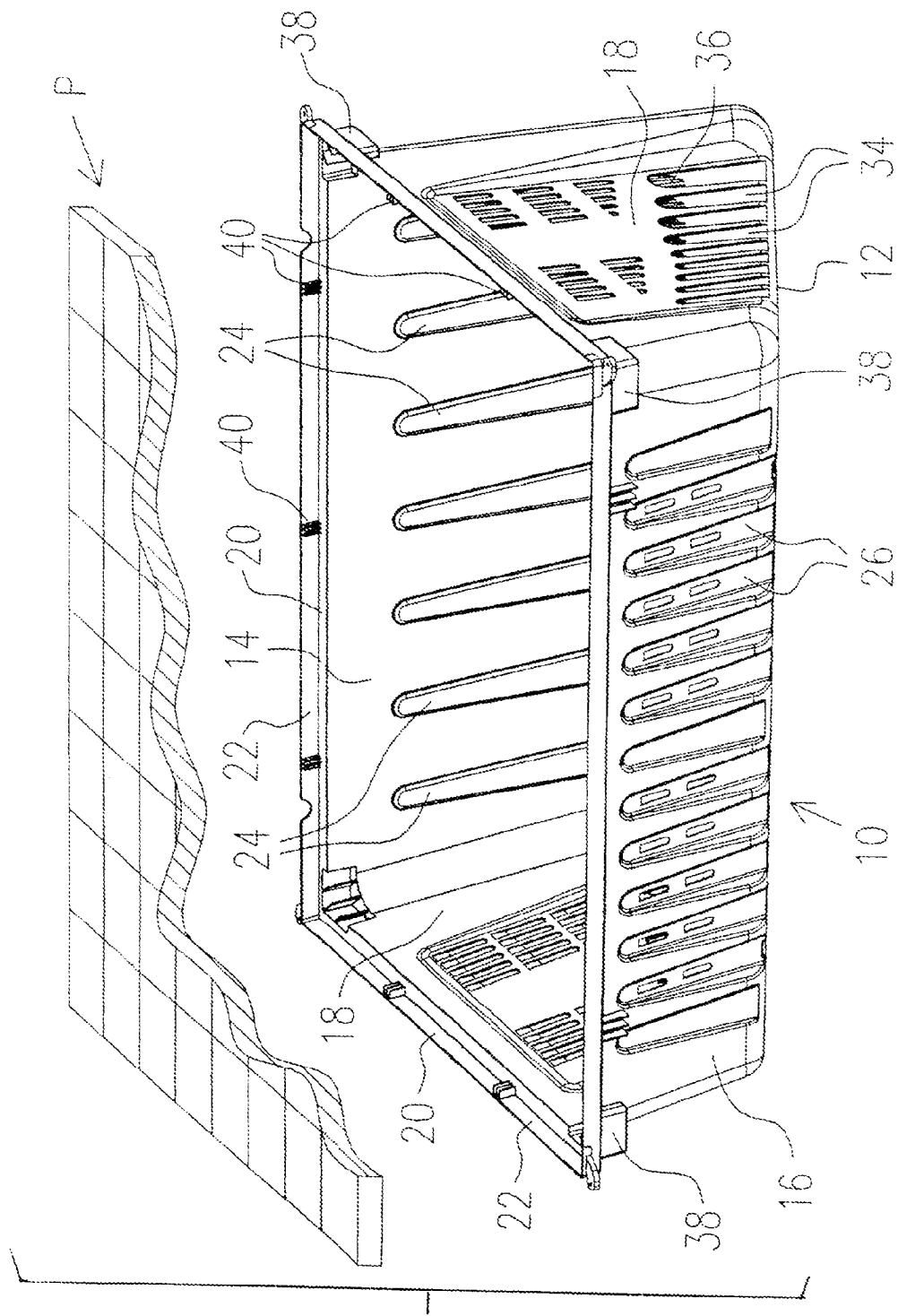
FIG. 1 is front perspective illustration of a solar panel support, illustrating an embodiment of the invention.
Figure 2:
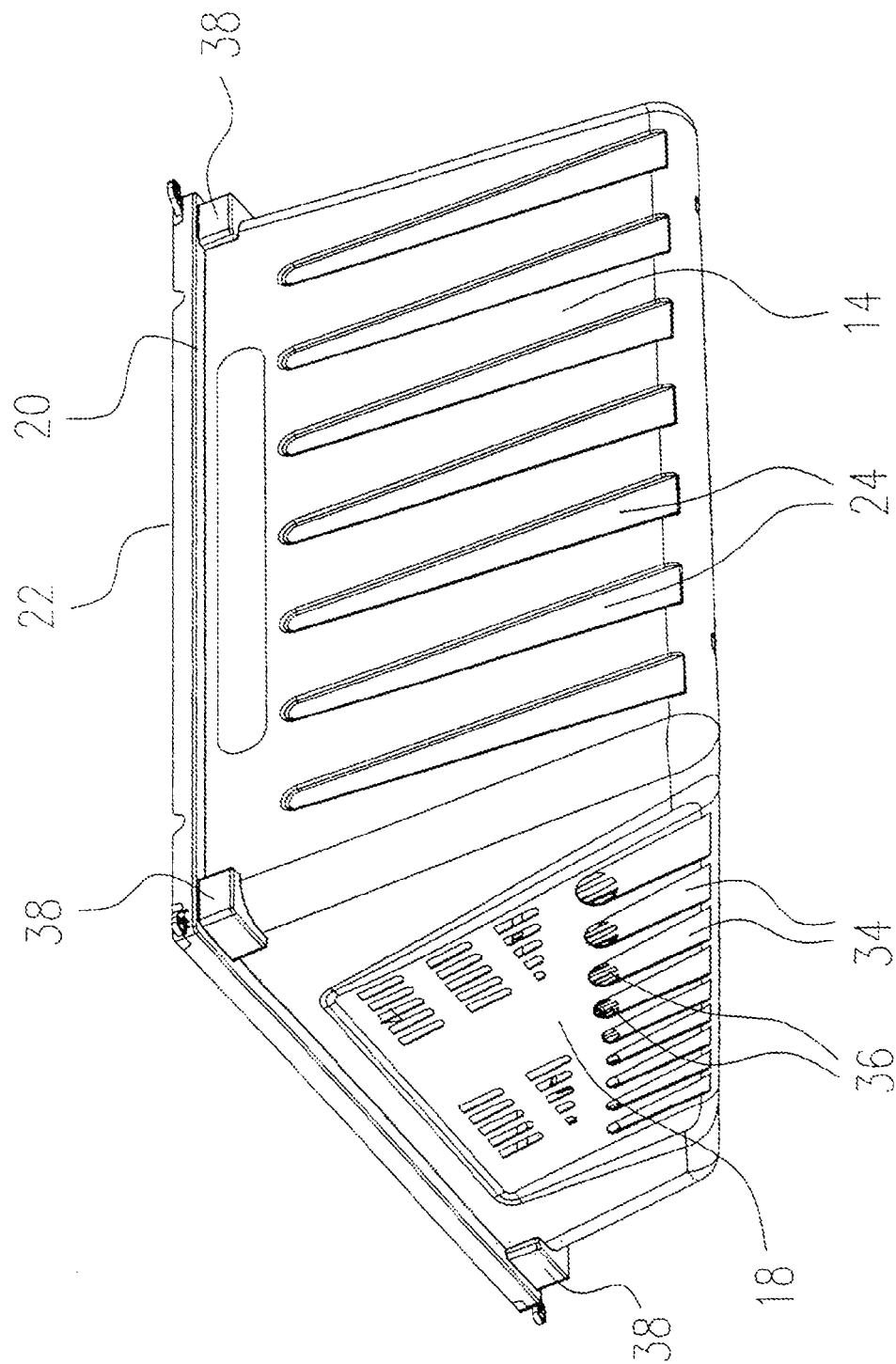
FIG. 2 is a rear perspective view of the solar panel support of FIG. 1.
Figure 3:
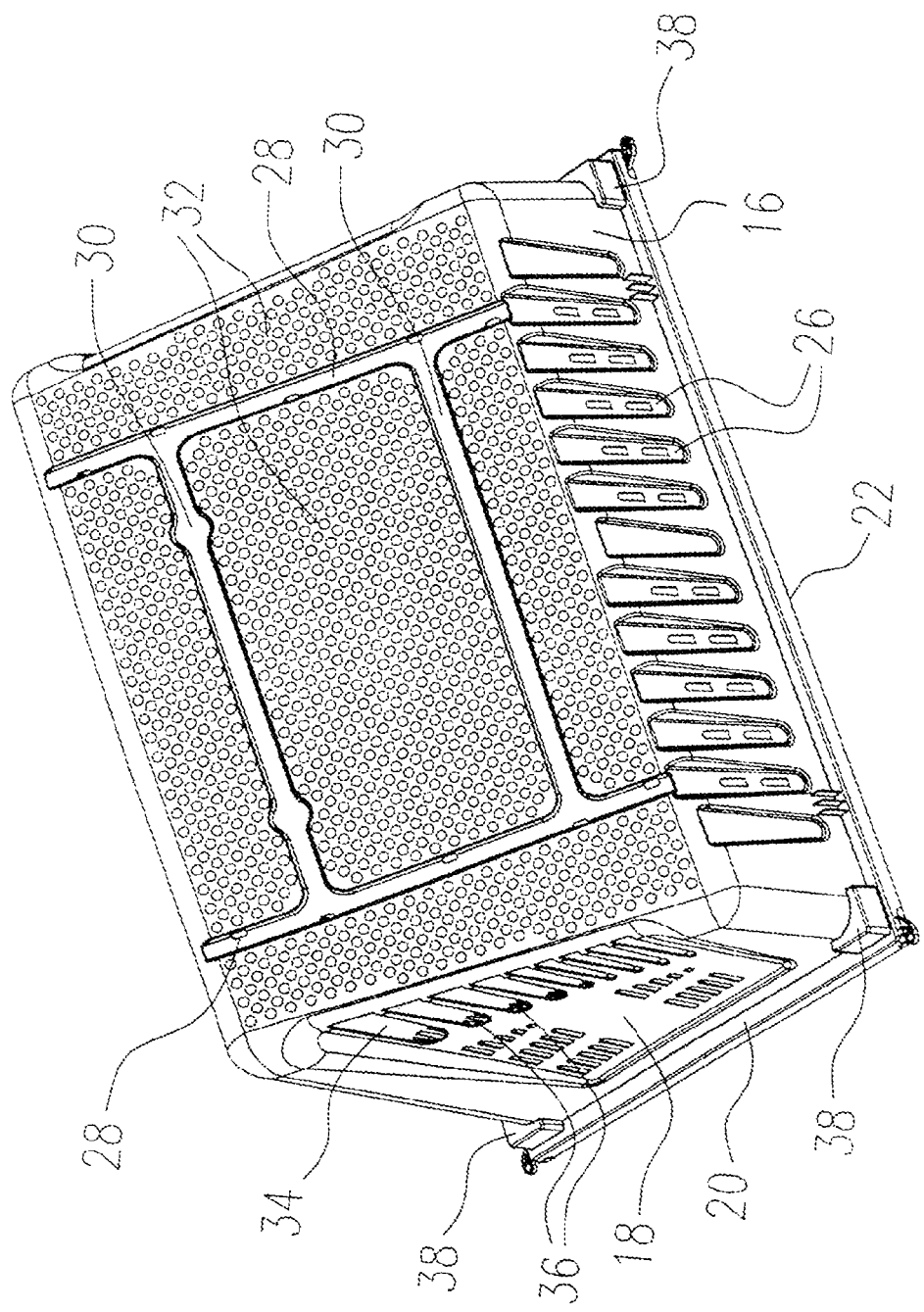
FIG. 3 is a bottom perspective of the solar panel support of FIG. 1.

An embodiment of the invention is illustrated generally in FIG. 1. The solar panel support will be seen to comprise an open top container indicated generally as container (10). The container is an integral one piece structure made of moulded thermo plastic material.

The container (10) will be seen to comprise in this embodiment, a bottom wall(12, a back wall (14), a front wall (16)and two opposed side walls (18).

The back wall (14) is of a first predetermined height, and the front wall (16), is of a second predetermined height. The front wall is lower than the back wall. As a result, the upper edges of the side walls (18) slope downwardly from the back wall to the front wall.

The angle of the slope is calculated in accordance with the desired optimum angle at which a solar panel (P) will be supported in the particular latitude for which the solar panel support is intended to be used. Clearly this will vary somewhat from one latitude to another. Around the upper edges of the back wall (14) front wall (16) and side walls (18), there is an outwardly transverse ledge (20), and around the edge of the ledge (20), there is an upstanding flange (22). The ledge (20) and the flange (22) are substantially normal to one another and define an L-shape in section.

The moulding of the solar panel support container (10) will normally define an angle or draft of the front and back walls and side walls, of approximately in the region of 4 degrees, from top to bottom, so as to facilitate removal from a mould.

The back wall (14) incorporates a plurality of generally wedge shaped depressions (24), extending upwardly from the bottom wall.

Similarly, the front wall (16), has a plurality of generally wedge shaped depressions (26) extending upwardly from the bottom wall.

The bottom wall has a first pair of parallel transverse grooves, (28) formed from back to front, and a second pair of parallel grooves (30) extending from side to side extending between the grooves (28).

The bottom wall is further defined by a large plurality of dimples or depressions (32), which may be generally circular in shape.

Referring now to the two side walls (18), these will be seen to be provided with a plurality of generally wedge shaped depressions (34), and a plurality of removable knock out portions (36). The knock out portions are relatively thinner than the rest of the material and may be selectively removed as required, for passing electrical services through from one support container (10) to the next.

This will enable the solar panel supports to be positioned side by side in an array, and electrical services connecting them can simply be passed from one to another.

At the upper corners of the front and back walls and side walls, there are provided generally rectangular abutments (38). These act as stop portions, so that when the solar panel supports are nested one within the other, they do not wedge tight.

In order to allow for some degree of expansion and contraction of the solar panel supports, there are a plurality of spacer elements (40), positioned in the L-shaped spaces defined by the ledge (20) and flange (22). These elements (40) are relatively thin and flexible, and allow for a certain degree of expansion and contraction, without displacing the solar panels themselves.

Solar panels (P) can be placed in position on the ledges (20), on each solar panel support container (10), and will be retained in position by the flanges (22) and elements (40).

The support containers (10) may simply be weighted internally to hold them in position.

The foregoing is a description of a preferred embodiment of the invention which is given here by way of example only. The invention is not to be taken as limited to any of the specific features as described, but comprehends all such variations thereof as come within the scope of the appended claims.

The invention claimed is:

1. A solar panel support formed of a single integral one piece molded plastic body; and compromising
a bottom wall;
two side walls;
front and back walls, said bottom, side, front, and back walls defining a hollow open topped box-like shape, wherein the front wall is lower than the back wall and the back wall is higher than the front wall;
upper side edges on said side walls sloping from the back wall down to the front wall;
a ledge extending out from said bottom, side, front, and back walls;
an upstanding flange around said ledge defining a generally L-shape in section;
a plurality of removable access portions in each said side wall, opening said removable access portions enabling passing of electrical services there through;
a plurality of generally wedge shaped depressions in said back wall;
a plurality of generally wedge shaped depressions in said front wall;
a rectangular depression in each said side wall surrounding said removable portions;
a generally right angular abutment formed at a junction between each of said side walls and said back wall and said front wall;
a plurality of generally circular depression formations in said bottom wall;
a first pair of generally parallel depressions running from back to front of said bottom wall, intermediate said side walls; and
a second pair of generally parallel depressions running between said first pair of parallel depressions, defining a generally rectangular shape in plan.

2. The solar panel support as claimed in claim 1 including four lifting tabs one at each corner between said side walls and said back and front walls.

3. The solar panel support as claimed in claim 2 and including a plurality of spacer abutments formed on said L-shaped flanges at spaced intervals.

4. The solar panel support as claimed in claim 3 and including a plurality of generally U-shaped recesses formed in said L-shaped flange on said back wall.

* * * * *